(12) United States Patent
Yang et al.

(10) Patent No.: US 11,186,743 B2
(45) Date of Patent: Nov. 30, 2021

(54) WATERBORNE EPOXY COATING COMPOSITION

(71) Applicants: Dow Global Technologies LLC, Midland, MI (US); Rohm and Haas Company, Collegeville, PA (US)

(72) Inventors: Weijun Yang, Shanghai (CN); Hu Li, Shanghai (CN); Longlan Cui, Shanghai (CN); Siyuan Jiang, Shanghai (CN); Tao Wang, Shanghai (CN); Yu Cai, Shanghai (CN); Jia Tang, Phoenixville, PA (US); Antony K. Van Dyk, Blue Bell, PA (US)

(73) Assignees: Dow Global Technologies LLC, Midland (ML); Rohm and Haas Company, Collegeville, PA (US)

( * ) Notice: Subject to any disclaimer, the term of this patent is extended or adjusted under 35 U.S.C. 154(b) by 213 days.

(21) Appl. No.: 16/614,414

(22) PCT Filed: Jun. 2, 2017

(86) PCT No.: PCT/CN2017/086906
§ 371 (c)(1),
(2) Date: Nov. 18, 2019

(87) PCT Pub. No.: WO2018/218631
PCT Pub. Date: Dec. 6, 2018

(65) Prior Publication Data
US 2021/0284863 A1    Sep. 16, 2021

(51) Int. Cl.
| | | |
|---|---|---|
| *C09D 163/00* | (2006.01) | |
| *C09D 7/65* | (2018.01) | |
| *C08K 3/013* | (2018.01) | |
| *C08G 59/22* | (2006.01) | |
| *C08G 59/32* | (2006.01) | |
| *C08G 59/50* | (2006.01) | |
| *C08F 212/08* | (2006.01) | |
| *C08F 228/02* | (2006.01) | |
| *C08F 230/02* | (2006.01) | |
| *C08F 2/18* | (2006.01) | |
| *C08F 2/22* | (2006.01) | |
| *C08F 2/38* | (2006.01) | |
| *C08L 33/08* | (2006.01) | |
| *C09D 5/08* | (2006.01) | |

(52) U.S. Cl.
CPC .............. *C09D 163/00* (2013.01); *C08F 2/18* (2013.01); *C08F 2/22* (2013.01); *C08F 2/38* (2013.01); *C08F 212/08* (2013.01); *C08F 228/02* (2013.01); *C08F 230/02* (2013.01); *C08G 59/22* (2013.01); *C08G 59/32* (2013.01); *C08G 59/50* (2013.01); *C08K 3/013* (2018.01); *C08L 33/08* (2013.01); *C09D 5/08* (2013.01); *C09D 7/65* (2018.01); *C08J 2425/18* (2013.01); *C08J 2433/14* (2013.01); *C08J 2441/00* (2013.01); *C08J 2443/02* (2013.01); *C08L 2201/52* (2013.01); *C08L 2201/54* (2013.01)

(58) Field of Classification Search
CPC ............... C08J 2443/02; C08J 2441/00; C08J 2425/18; C08J 2433/14; C09D 143/02; C09D 141/00; C09D 133/14; C09D 133/24; C09D 163/00–10; C08L 63/00–10

See application file for complete search history.

(56) References Cited

U.S. PATENT DOCUMENTS

| | | |
|---|---|---|
| 6,660,793 B1 | 12/2003 | McIntyre et al. |
| 8,158,561 B2 | 4/2012 | Greyson et al. |
| 8,658,742 B2 | 2/2014 | Dombrowski et al. |
| 8,816,016 B2 | 8/2014 | Brady |
| 2007/0208129 A1 | 9/2007 | Finegan et al. |
| 2012/0301621 A1 | 11/2012 | Dombrowski et al. |
| 2019/0249032 A1* | 8/2019 | Wang ................... C09D 163/00 |

FOREIGN PATENT DOCUMENTS

| | | |
|---|---|---|
| CN | 1330117 | 1/2002 |
| CN | 1688614 | 10/2005 |
| CN | 103980801 | 8/2014 |
| CN | 104140743 | 11/2014 |
| WO | 2015094731 A1 | 6/2015 |

OTHER PUBLICATIONS

International Search Report; International Application No. PCT/CN2017/086906; International Filing Date: Jun. 2, 2017; dated Feb. 24, 2018; 3 pages.

Written Opinion; International Application No. PCT/CN2017/086906; International Filing Date: Jun. 2, 2017; dated Feb. 24, 2018; 3 pages.

\* cited by examiner

*Primary Examiner* — Kregg T Brooks
(74) *Attorney, Agent, or Firm* — Karl E. Stauss; Cantor Colburn LLP

(57) ABSTRACT

A stable two-component waterborne coating composition comprising an epoxy component A comprising a waterborne epoxy resin, a polymeric dispersant, and pigments and/or extenders; and a component B comprising a curing agent; providing coatings made therefrom with improved anti-corrosion properties; and a method of preparing the coating composition.

12 Claims, No Drawings

WATERBORNE EPOXY COATING COMPOSITION

FIELD OF THE INVENTION

The present invention relates to a waterborne epoxy coating composition.

INTRODUCTION

Epoxy coatings are extensively used in construction coatings and protective coatings because of their chemical resistance, corrosion protection and mechanical properties. Waterborne epoxy binders have much less environmental concerns than conventional solvent epoxy resins.

Waterborne epoxy coating compositions are typically formed from two components, a waterborne epoxy component (Component A) and a hardener component (Component B). The two components are mixed prior to application of the coating compositions to prevent coagulation. When pigments and/or extenders are included in waterborne epoxy coating compositions, dispersants are usually used to disperse pigments and/or extenders in Component A. Conventional anionic acrylic polymeric dispersants derived from carboxylic acid monomers can afford sufficient dispersing efficiency for pigments and/or extenders, but usually cause a colloidal stability issue of Component A due to the reaction of acrylic carboxylate groups of the acrylic polymer dispersant with oxirane groups of an epoxy resin. Use of non-ionic dispersants may solve the above described stability issue, but usually requires higher loading to provide comparable dispersing efficiency as compared to anionic acrylic polymeric dispersants, thus negatively impact anti-corrosion properties. Another approach is to disperse pigments and/or extenders into the hardener component of waterborne epoxy coating compositions. For example, US2012/0301621A discloses a coating composition comprising aqueous dispersions of acrylic polymer particles imbibed with epoxy resins in Component A, and pigments and a curing agent added in Component B at a weight ratio of Component A to Component B being about 3:2, but operation difficulties may arise in regard to incorporation of Component B to a similar amount of Component A.

Therefore, it is desirable to provide a novel stable two-component epoxy coating composition comprising pigments and/or extenders dispersed in a waterborne epoxy component by a dispersant, and a hardener component, which provides coatings made therefrom with improved corrosion resistance properties.

SUMMARY OF THE INVENTION

The present invention provides a novel two-component waterborne coating composition comprising an epoxy component A (hereinafter "Component A") comprising a waterborne epoxy resin, a polymeric dispersant, and pigments and/or extenders dispersed therein, and a component B (hereinafter "Component B") comprising a curing agent. Component A and Component B are mixed prior to application of the coating composition. The polymeric dispersant can provide desirable dispersing efficiency for pigments and/or extenders. The coating composition of the present invention has good stability as indicated by heatage viscosity change of 15 Krebs Units (KU) or less after storage at 50° C. for 14 days. The coating composition can also provide coatings made therefrom with improved salt spray corrosion resistance as indicated by a blister rating of "2F" or better at a dry film thickness of 50-60 μm after at least 130 hours of exposure to salt spray when coated onto a corrosion susceptible substrate. The dispersing efficiency, heatage stability and salt spray test may be measured according the test methods described in the Examples section below.

In a first aspect, the present invention is a two-component waterborne coating composition comprising an epoxy component A and a component B, wherein the epoxy component A comprises a waterborne epoxy resin, a polymeric dispersant, and pigments and/or extenders;

wherein the polymeric dispersant comprises (a) structural units of an ethylenically unsaturated sulfonic acid-containing monomer, a salt thereof, or a combination thereof, and (b) structural units of an ethylenically unsaturated phosphorous-containing monomer, wherein the combined amount of (a) and (b) is from 10% to 35% by weight based on the dry weight of the polymeric dispersant, and the weight ratio of (a)/(b) is from 0.3 to 20; and wherein the component B comprises a curing agent.

In a second aspect, the present invention is a method of preparing a two-component waterborne coating composition of the first aspect. The method comprises: admixing an epoxy component A and a component B, wherein the epoxy component A comprises a waterborne epoxy resin, a polymeric dispersant, and pigments and/or extenders;

wherein the polymeric dispersant comprises (a) structural units of an ethylenically unsaturated sulfonic acid-containing monomer, a salt thereof, or a combination thereof, and (b) structural units of an ethylenically unsaturated phosphorous-containing monomer, wherein the combined amount of (a) and (b) is from 10% to 35% by weight based on the dry weight of the polymeric dispersant, and the weight ratio of (a)/(b) is from 0.3 to 20; and wherein the component B comprises a curing agent.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

The waterborne coating composition of the present invention is formed from two components—Component A and Component B. Component A is a binder phase and comprises a waterborne epoxy resin, a polymeric dispersant, and pigments and/or extenders, in which the pigments and/or extenders are preferably dispersed in Component A by the polymeric dispersant. Component B is a hardener phase and comprises a hardener (i.e., curing agent).

The polymeric dispersant useful in the present invention comprises a combination of (a) structural units of one or more ethylenically unsaturated sulfonic acid-containing monomers, salts thereof, or combinations thereof, and (b) structural units of one or more ethylenically unsaturated phosphorous-containing monomer. As used herein, the term structural units, also known as polymerized units, of the named monomer refers to the remnant of the monomer after polymerization. For example, a structural unit of methyl methacrylate is as illustrated:

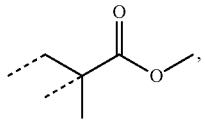

where the dotted lines represent the points of attachment of the structural unit to the polymer backbone.

The combined amount of (a) structural units of the ethylenically unsaturated sulfonic acid-containing monomers, a salt thereof, and a combination thereof, and (b) structural units of the ethylenically unsaturated phosphorous-containing monomer may be, by weight based on the dry weight of the polymeric dispersant, 10% or more, 15% or more, 18% or more, or even 20% or more, and at the same time, 35% or less, 33% or less, 30% or less, or even 28% or less. The weight ratio of (a) to (b) is preferably 0.3 or higher, 0.35 or higher, 0.4 or higher, 0.45 or higher, 0.5 or higher, 0.55 or higher, 0.6 or higher, or even 0.65 or higher, and at the same time, 20.0 or less, 18.0 or less, 15.0 or less, 12.0 or less, 10.0 or less, 7.5 or less, 5.0 or less, or even 3.0 or less.

The ethylenically unsaturated sulfonic acid-containing monomer and/or salts thereof useful in the present invention may include sodium styrene sulfonate (SSS), sodium vinyl sulfonate (SVS), 2-acrylamido-2-methylpropanesulfonic acid (AMPS), salts of the ethylenically unsaturated sulfonic acid-containing monomer such as sodium 2-acrylamido-2-methylpropane sulfonate, or mixtures thereof. The polymeric dispersant may comprise, by weight based on the dry weight of the polymeric dispersant, 6% or more, 7% or more, 8% or more, 9% or more, or even 10% or more, and at the same time, 23% or less, 22% or less, 20% or less, 18% or less, or even 15% or less of (a) structural units of the ethylenically unsaturated sulfonic acid-containing monomers and/or salts thereof.

The ethylenically unsaturated phosphorous-containing monomers useful in the present invention can be dihydrogen phosphate esters of an alcohol in which the alcohol contains or is substituted with a polymerizable vinyl or olefinic group. The ethylenically unsaturated phosphorous-containing monomers may comprise phosphorous acid monomers and salts thereof. Suitable ethylenically unsaturated phosphorous-containing monomers may include phosphoalkyl (meth)acrylates such as phosphoethyl (meth)acrylate, phosphopropyl (meth)acrylate, phosphobutyl (meth)acrylate, salts of phosphoalkyl (meth)acrylates, and mixtures thereof; $CH_2=C(R)-C(O)-O-(R_pO)_n-P(O)(OH)_2$, wherein R=H or $CH_3$ and $R_p$=alkyl, n is from 1 to 20, such as SIPOMER PAM-100, SIPOMER PAM-200, SIPOMER PAM-300, and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho dipropylene glycol (meth)acrylate, phospho tri-propylene glycol (meth)acrylate, salts thereof, and mixtures thereof. Preferred ethylenically unsaturated phosphorus-containing monomer is selected from the group consisting of phosphoethyl (meth) acrylate, phosphopropyl (meth)acrylate, phosphobutyl (meth)acrylate, salts thereof, and mixtures thereof; more preferably, phosphoethyl methacrylate (PEM). The polymeric dispersant may comprise, by weight based on the dry weight of the polymeric dispersant, 1.5% or more, 2% or more, 3% or more, 4% or more, or even 5% or more, and at the same time, 19% or less, 18% or less, 17% or less, 16% or less, or even 15% or less of (b) structural units of the ethylenically unsaturated phosphorous-containing monomer.

The polymeric dispersant useful in the present invention may also comprise (c) structural units of one or more ethylenically unsaturated nonionic monomers. The term "nonionic monomers" herein refers to monomers that do not bear an ionic charge between pH=1-14. Suitable examples of the ethylenically unsaturated nonionic monomers include, for example, alkyl esters of (meth)acrylic acids such as methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxy-functional (meth)acrylic acid alkyl ester such as hydroxyethyl (meth)acrylate and hydroxypropyl (meth)acrylate; (meth)acrylonitrile; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride; or combinations thereof. Preferred ethylenically unsaturated nonionic monomers are butyl acrylate, butyl methacrylate, methyl methacrylate, 2-ethylhexyl acrylate, decyl acrylate, lauryl acrylate, isodecyl methacrylate, lauryl methacrylate, styrene, and mixtures thereof. The polymeric dispersant may comprise, by weight based on the dry weight of the polymeric dispersant, 50% or more, 60% or more, 65% or more, or even 70% or more, and at the same time, 90% or less, 85% or less, 82% or less, or even 80% or less of structural units of the ethylenically unsaturated nonionic monomer. The polymeric dispersant useful in the present invention may optionally comprise (d) structural units of one or more α, β-ethylenically unsaturated carboxylic acid monomers. Examples of suitable α, β-ethylenically unsaturated carboxylic acid monomers include monobasic acids such as acrylic, methacrylic, crotonic, and acyloxypropionic acids; and dibasic acid monomers such as maleic, fumaric, and itaconic acids; or mixtures thereof. The polymeric dispersant may comprise, by weight based on the dry weight of the polymeric dispersant, 0 or more, 0.01% or more, or even 0.1% or more, and at the same time, 10% or less, 8% or less, 5% or less, or even 1% or less of structural units of the α,β-ethylenically unsaturated carboxylic acid monomer.

In some embodiments, the polymeric dispersant comprises, based on the dry weight of the polymeric dispersant, from 10% to 15% by weight of structural units of the ethylenically unsaturated sulfonic acid-containing monomer such as SSS, SVS, AMPS, salts thereof, and mixtures thereof; from 5% to 15% by weight of structural units of the ethylenically unsaturated phosphorous-containing monomer such as PEM, and mixtures thereof; from 70% to 80% by weight of structural units of the ethylenically unsaturated nonionic monomer such as styrene, 2-ethylhexyl acrylate, decyl acrylate, lauryl acrylate, isodecyl methacrylate, lauryl methacrylate, and mixtures thereof; and optionally from 0 to 1% by weight of structural units of the α,β-ethylenically unsaturated carboxylic acid monomers such as acrylic acid, methacrylic acid, maleic acid, fumaric acid, itaconic acid, and mixtures thereof.

The polymeric dispersant useful in the present invention may have a weight average molecular weight of from 300 to 50,000 daltons, from 500 to 40,000 daltons, from 1,000 to 30,000 daltons, from 3,000 to 25,000 daltons, from 5,000 to 20,000 daltons, or from 6,000 to 15,000, as measured by Gel Permeation Chromatography (GPC) with polystyrene standards as described in the Examples section below.

The polymeric dispersant useful in the present invention can provide better dispersing efficiency for pigments and/or extenders as compared to polymeric dispersants comprising either (a) or (b) described above. The polymeric dispersant may be present, by dry weight based on the total dry weight of pigments and/or extenders in Component A, 0.01% or more, 0.15% or more, or even 0.02% or more, and at the same time, 10% or less, 5% or less, or even 3% or less.

The polymeric dispersant useful in the present invention may be prepared by free-radical polymerization of the monomers described above, preferably emulsion polymerization. Dosage of each monomer, based on the total weight of monomers, is substantially the same as dosage of structural units of such monomer based on the dry weight of the polymeric dispersant. Total weight concentration of monomers for preparing the polymeric dispersant is equal to 100%. A mixture of monomers for preparing the polymeric dispersant, may be added neat or as an emulsion in water; or added in one or more additions or continuously, linearly or nonlinearly, over the reaction period of preparing the polymeric dispersant. Temperature suitable for the polymerization process may be lower than 100° C., in the range of from 30° C. to 95° C., or in the range of from 50° C. to 90° C. Multistage free-radical polymerization using the monomers described above can be used, which at least two stages are formed sequentially, and usually results in the formation of the multistage polymer comprising at least two polymer compositions.

In the polymerization process for preparing the polymeric dispersant, free radical initiators may be used. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process for preparing the polymeric dispersant, one or more surfactants may be used. The surfactant may be added prior to or during the polymerization of the monomers, or combinations thereof. A portion of the surfactant can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The surfactant used is usually from 0.1% to 10% by weight, preferably from 0.2% to 3% by weight, based on the weight of total monomers used for preparing the polymeric dispersant.

In the polymerization process for preparing the polymeric dispersant, a chain transfer agent may be used. Examples of suitable chain transfer agents in preparing the polymeric dispersant include n-dodecylmercaptan (nDDM), and 3-mercaptopropionic acid, methyl 3-mercaptopropionate (MMP), butyl 3-mercaptopropionate (BMP), benzenethiol, azelaic alkyl mercaptan, or mixtures thereof. The chain transfer agent may be used in an effective amount to control the molecular weight of the polymeric dispersant. Preferably, the chain transfer agent is used in an amount of 0.001% or more, 0.01% or more, or even 0.1% or more, and at the same time, 20% or less, 15% or less, or even 10% or less, by weight based on the total weight of monomers used for preparing the polymeric dispersant.

The obtained polymeric dispersant may have a pH value of from 0.5 to 5.0, from 1.0 to 4.5, or from 1.5 to 4.0. The polymeric dispersant may have a viscosity of from 0 to 100 centipoises (cP), from 0 to 80 cP, or from 0 to 60 cP, as measured by $2^{\#}$ spindle of Brookfield viscosity meter at 60 rpm.

The polymeric dispersant useful in the present invention may become water-soluble or partially water-soluble upon neutralization. Neutralization can be conducted by adding one or more bases into the polymeric dispersant. Examples of suitable bases include ammonia; alkali metal or alkaline earth metal compounds such as sodium hydroxide, potassium hydroxide, calcium hydroxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The polymeric dispersant useful in the present invention may have a weight average particle size of from 50 nanometers (nm) to 300 nm, from 80 nm to 200 nm, or from 90 nm to 150 nm, as measured by a Brookhaven BI-90 or 90Plus Particle Sizer.

Component A of the coating composition of the present invention further comprises one or more waterborne epoxy resins. The waterborne epoxy resin useful in the present invention can be a water-based epoxy resin and dispersed/emulsified in water. The waterborne epoxy resin can be any conventional, water-dispersible epoxy resins. The waterborne epoxy resin can be a self-emulsified epoxy resin, or an emulsion or a dispersion of one or more epoxy compounds and a surfactant (e.g., a nonionic or ionic surfactant) used for emulsifying the epoxy compounds. The self-emulsified epoxy resin may be mixed with water to form an aqueous dispersion. The self-emulsified epoxy resin can be an adduct of an epoxy compound with a hydrophilic monomer or polymer containing at least one group selected from carboxyl, hydroxyl, sulfonate group, ethylene oxide group or amino group. The epoxy compound can be a di-, tri- or tetraglycidyl ether or a di-, or tri- tetraglycidyl ester.

Examples of suitable epoxy compounds include diglycidyl ether of bisphenol A, diglycidyl ether of bisphenol F, 1,4-butanediol diglycidyl ether, 1,6-hexanediol diglycidyl ether, diglycidyl ester of phthalic acid, 1,4-cyclohexanedmethanol diglycidyl ether, 1,3-cyclohexanedmethanol diglycidyl ether, diglycidyl ester of hexahydrophthalic acid, epoxy novolac resins, or mixtures thereof. Two or more waterborne epoxy resins can be used as a mixture. A commercially available aqueous epoxy dispersion is OUDRASPERSE WB-6001 available from Olin Corporation.

In some embodiments, the waterborne epoxy resin can be an aqueous dispersion of acrylic polymer particles imbibed with an epoxy compound (herein "epoxy imbibed latex". The epoxy compound include those described above. The acrylic polymer particles in the epoxy imbibed latex are characterized by having a sufficient concentration of anti-agglomerating functional groups to stabilize the epoxy imbibed latex against agglomeration. The imbibed waterborne epoxy is as described in US2012/0301621A. A commercially available epoxy imbibed latexes is MAINCOTE™ AEH-20 available from The Dow Chemical Company (MAINCOTE is a trademark of The Dow Chemical Company).

The aqueous dispersion of acrylic polymer particles in the epoxy imbibed latex can be achieved through free radical emulsion or suspension addition polymerization or by dispersion of a preformed polymer under shear into an aqueous medium. The acrylic polymer herein refers to a polymer comprising structural units of one or more acrylic monomers. Preferably, an acrylic latex or a styrene-acrylic latex is used.

The acrylic polymer in the epoxy imbibed latex may contain anti-agglomerating functional groups, which refer to hydrophilic groups that are sufficiently unreactive with the oxirane groups in the epoxy resin. The anti-agglomerating functional groups in the acrylic polymer particles can be incorporated into the acrylic polymer particles using monomers containing anti-agglomerating functional groups (anti-agglomerating monomers). The anti-agglomerating functional groups are generally selected from amide groups, acetoacetoxy groups, strong protic acids which are pH adjusted to form their conjugate bases, or a combination thereof. Examples of suitable anti-agglomerating functional groups are functional groups of acrylamide; acetoacetoxyethyl methacrylate; acetoacetoxyethyl methacrylate enamine; sodium p-styrene sulfonate; 2-acrylamido-2-methylpropane sulfonic acid or a salt thereof; phosphoethyl methacrylate or a salt thereof; or combinations thereof. The concentration of anti-agglomerating functional groups in the acrylic polymer particles may be 0.5% or higher or even 1% or higher, and at the same time, 10% or lower or even 5% or lower, by weight based on the weight of the acrylic polymer. The acrylic polymer in the epoxy imbibed latex may further include structural units of one or more ethylenically unsaturated carboxylic acid monomers as described above in the polymeric dispersant, such as acrylic acid, methacrylic acid, and itaconic acid, in an amount of from 0.1% to 5% or up to 20% by weight, based on the weight of the acrylic polymer. These acrylic polymer may further include structural units of one or more multi-ethylenically unsaturated monomers such as allyl (meth)acrylate; diallyl phthalate; 1,4-butylene glycol di(meth)acrylate; 1,2-ethylene glycol di(meth)acrylate; 1,6-hexanediol di(meth) acrylate; divinyl benzene; or mixtures thereof. Moreover, one or more ethylenically unsaturated nonionic monomers as described above in the polymeric dispersant section may be also included to form structural units of the acrylic polymer.

The acrylic polymer particles may be prepared according to the same process for preparing the polymeric dispersant.

The epoxy imbibed latex useful in the present invention is advantageously prepared as disclosed in US2012/0301621A, e.g., separately from the acrylic polymer dispersion using conventional emulsion polymerization techniques (e.g., as described above for preparing the polymeric dispersant), then combined with the epoxy compound. The epoxy compound can be neat or in the form of an aqueous dispersion, preferably as an aqueous dispersion, and more preferably as a micronized aqueous dispersion. When the epoxy compound is added as an aqueous dispersion, the dispersion of the epoxy compound is stabilized with a stabilizing amount of a surfactant, preferably at a concentration in the range of 0.5% to 5% by weight. Nonionic surfactants are preferred, including alkyl phenol ethoxylate (APEO) free, non-ionic wetting agents such as polyalkylene oxide block copolymers, polyoxyethyleneglycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON™ X-405 octylphenol ethoxylate available from The Dow Chemical Company. When the epoxy compound combined with the acrylic polymer dispersion as a neat compound, imbibing is facilitated by agitation at or above room temperature. The weight average particle size of the epoxy imbibed latex is typically in the range of from 150 to 350 nm. Weight average particle size is determined using light scattering.

The epoxy imbibed latex useful in the present invention may have a high solids content, that is, latexes with solids content of at least 40% and particularly in the range of 45-60%, by weight based on the total weight of the epoxy imbibed latex. These epoxy imbibed latexes can include high levels of the acrylic polymer, typically in the range of from 20% to 60% or from 30% to 50%, by weight based on the total weight of the acrylic polymer and the epoxy compound.

The waterborne epoxy resin in Component A may be present, by dry weight based on the total dry weight of Component A, in an amount of 5% or more, 10% or more, 15% or more, or even 20% or more, and at the same time, 80% or less, 70% or less, 65% or less, or even 60% or less.

Component A of the coating composition of the present invention further comprises pigments and/or extenders. "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. Preferred pigment is $TiO_2$. $TiO_2$ typically exists in two crystal forms, anastase and rutile. $TiO_2$ may be also available in concentrated dispersion form. Component A of the coating composition may also comprise one or more extenders. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof.

The coating composition of the present invention further comprises Component B. Component B includes curing agents (i.e., hardeners) to cure the coating composition.

Examples of suitable curing agents include diethylenetriamine, triethylenetetramine, tetraethylene-pentamine, 2,2,4-trimethylhexamethylenediamine, 2,4,4-trymethylhexamethylenediamine, 1,6-hexanediamine, 1-ethyl-1,3-propanediamine, bis(3-aminopropyl)piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norboranediamine, 4,4'-diaminodicyclohexylmethane, 4,4'-diaminodicyclohexylmethane, 4,4'-diaminodicyclohexyl-propane, 2,2-bis(4-aminocyclohexyl) propane, 3,3'-dimethyl-4,4'-diaminodicyclohexylmethane, 3-amino-1-cyclohexane-amino-propane, 1,3- and 1,4-bis (aminomethyl)cyclohexane, m-xylylenediamine, p-xylylenediamine, polyoxypropylenediamines, polyamidoamines and aminoplast resins formed by the reaction of ureas and melamines with aldehydes. Commercially available curing agents include Epi-cure 8535, 8536, 8537, 8290 and 8292 curing agents available from Hexion; Anquamine 401 and Epilink 381 curing agents available from Air Products; Beckopox EH659W, EH623W and VEH2133W curing agents available from Allnex; and Epotuf 37-680 and 37-681 curing agents available from Reichhold.

Component A and/or Component B can optionally include other ingredients such as water, a coalescent, a defoamer, a wetting agent, a thickener, or mixtures thereof.

"Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The concentration of the defoamer may be, based on the total dry weight of the coating composition, generally from 0 to 2% by weight, from 0.02% to 0.5% by weight, or from 0.04% to 0.2% by weight.

The thickeners useful in the present invention may include associative thickeners such as hydrophobically modified ethoxylated urethanes (HEUR). The concentration of the thickener may be, based on the total dry weight of the waterborne coating composition, generally from 0 to 10% by weight, from 0.1% to 4% by weight, or from 0.5% to 2% by weight.

"Wetting agents" herein refer to chemical additives that reduce the surface tension of a coating composition, causing the coating composition to more easily spread across or penetrate the surface of a substrate. Wetting agents may be anionic, zwitterionic, or non-ionic. The concentration of the wetting agent may be, by weight based on the total dry weight of the coating composition, from 0 to 5%, 0.01% to 2%, or from 0.2% to 1%.

"Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The concentration of the coalescent may be, based on the total dry weight of the coating composition, from 0 to 10% by weight, from 0.01% to 9% by weight, or from 1% to 8% by weight.

In addition to the components described above, the coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, and grind vehicles. When present, these additives may be present in a combined amount of from 0 to 10% by weight, from 0.01% to 2% by weight, or from 0.05% to 1% by weight, based on the total weight of the waterborne coating composition.

Component A and Component B are mixed together to form the coating composition prior to application. The amount of the curing agent used generally varies from about 1:0.75 to 1:1.5 and preferably from 1:1 to 1:1.4, active hydrogen equivalent to oxirane equivalent of the waterborne epoxy resin. The weight ratio of Component A to Component B in the coating composition may be from 90:1 to 1:1, from 40:1 to 2:1, from 25:1 to 4:1, or from 15:1 to 5:1, affording flexibility in operation.

The waterborne coating composition of the present invention may have a pigment volume concentration (PVC) of from 5% to 90%, from 10% to 85%, or from 15% to 80%. PVC may be determined according to the following equation:

$$\text{PVC \%} = [\text{Volume}_{(Pigment+Extender)} / \text{Volume}_{(Pigment+Extender+Binder)}] \times 100\%$$

The binder herein includes the waterborne epoxy resin in Component A and the curing agent in Component B.

The solids content of the coating composition of the present invention may be from 20% to 70% by weight, from 25% to 65% by weight, or from 30% to 50% by weight.

The coating composition of the present invention may be prepared by admixing Component A and Component B as described above. The pigments and/or extenders are preferably mixed with the polymeric dispersant to form a slurry of the pigments and/or extenders. The obtained admixture may be then subjected to shearing in a grinding or milling device as is well known in the pigment dispersion art. Such grinding or milling devices include roller mills, ball mills, bead mills, attrittor mills and include mills in which the admixture is continuously recirculated. The shearing of the admixture is continued for a time sufficient to disperse the pigments and/or extenders. The waterborne epoxy resin and other ingredients are added to the pigment and/or extender grinds under low speed stirring to form Component A.

The coating composition of the present invention provides coatings made therefrom with improved salt spray corrosion resistance. For example, the coating composition exhibits a blister rating of "2F" or better at a dry film thickness of 50-60 μm after at least 130 hours of exposure to salt spray when coated onto a corrosion susceptible substrate, such as cold rolled steel. The coating composition may also have good stability, for example, good heatage stability as indicated by heatage viscosity change of 15 Krebs Units (KU) or less, or even 10 KU or less, after storage at 50° C. for 14 days. The salt spray and heatage stability tests may be conducted according to the test methods described in the Examples section below.

The present invention also relates to a method of improving corrosion resistance of a coating. The method may comprise (i) providing the coating composition of the present invention, (ii) applying the coating composition to a substrate; and (iii) drying, or allowing to dry, the coating composition to obtain the coating, wherein the coating has an improved corrosion resistance as defined above. The coating composition can be applied to, and adhered to, various substrates. Examples of suitable substrates include wood, metals, plastics, foams, stones, elastomeric substrates, glass, fabrics, concrete, or cementitious substrates. The coating composition is suitable for various applications such as marine and protective coatings, automotive coatings, traffic paint, Exterior Insulation and Finish Systems (EIFS), roof mastic, wood coatings, coil coatings, plastic coatings, can coatings, architectural coatings, and civil engineering coatings. The coating composition is particularly suitable for industrial coatings.

The coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (20-25° C.), or at an elevated temperature, for example, from 35° C. to 60° C.

EXAMPLES

Some embodiments of the invention will now be described in the following Examples, wherein all parts and percentages are by weight unless otherwise specified.

Styrene ("ST") is available from Evonik Industry.

SIPOMER PAM-4000 ("PAM-4000"), available from Solvay, is phosphoethyl methacrylate.

AMPS 2405 Monomer, available form Lubrizol, is 50% aqueous solution of sodium 2-acrylamido-2-methylpropane sulfonate (i.e., sodium salt of AMPS).

n-Dodecyl mercaptan ("nDDM") is available from Sinopharm Chemical Reagent Co., Ltd.

DISPONIL FES 993 ("FES 993") surfactant, available from BASF, is a fatty polyglycol ether sulphate, sodium salt.

Ferrous sulfate heptahydrate ($FeSO_4.7H_2O$) is available from Sinopharm Chemical Reagent Co., Ltd.

Sodium styrene sulfonate ("SSS"), sodium persulfate ("SPS"), tert-Butyl hydroperoxide ("t-BHP"), and isoascorbic acid ("IAA") are all available from The Dow Chemical Company.

KATHON™ LX 1.4% microbiocide, available from The Dow Chemical Company, is a methyl and cloroisothiazolinone.

TEGO 902W Defoamer, TEGO 1488 Defoamer, and TEGO Twin 4100 Surfactant are all available from TEGO.

Ti-Pure R-902 Titanium Dioxide is available from Chemours.

Nubirox 106, available from Nubiola, is an anti-rust pigment.

Talc 800, available from Shandong Huasheng Fine Chemical, China, is talc.

Blanc Fixe N $BaSO_4$ 1250, available from Sachtleben Chemie Gmbh, is Barium Sulfate.

MAINCOTE AEH-20 ("AEH-20") dispersion (solids: 50%), available from The Dow Chemical Company, is an acrylic/epoxy hybrid dispersion used as a binder and has an epoxy equivalent weight of 1000-1300 g/mol.

TEXANOL Coalescent is available from The Eastman Chemical Company.

ACRYSOL™ RM-12W Nonionic Thickener is available from The Dow Chemical Company

Beckopox EH 613W/80WA Hardener, available from Allnex, is an amine hardener and has an H-equivalent weight of 145 g/mol.

KATHON and ACRYSOL are trademarks of The Dow Chemical Company.

The following standard analytical equipment and methods are used in the Examples.

Heatage Stability

A Stormer viscometer was used to analyze the medium shear viscosity of a coating composition according to the ASTM (American Society for Testing and Materials) D562-10(2014) method. After the coating composition was formed, an initial viscosity (KU as units) of the coating composition was analyzed at room temperature, and then the coating composition was stored in an oven at 50° C. for 14 days. The viscosity of the coating composition after storage was analyzed and recorded as the final viscosity. The difference between the initial viscosity and the final viscosity was defined as the heatage viscosity change. Heat-age viscosity change being 15 KU or less indicates acceptable heatage stability. The smaller heat-age viscosity change, the better heatage stability.

Salt Spray Test

The surface of cold rolled steel panels were cleaned prior to coating application. Then a coating composition was applied on the cold rolled steel panels by drawdown bar and allowed to dry in a constant temperature room (CTR, 25° C., 50% relative humidity ("RH")) for 7 days prior to testing. The obtained dry coating films had a thickness in the range of 50-60 µm. The coated panels were sealed by 3M tape and a scribe mark made with a razor blade was scratched into the bottom half of the panels immediately before exposure. Salt spray corrosion resistance was tested by exposure of the as prepared panels to a salt spray environment (5% sodium chloride fog) in accordance with the ASTM B-117-2011 method. Panels were exposed to the salt spray environment for 130 hours, and then removed to rate blistering. Blister ratings were conducted in accordance with the ASTM D714-02(2009) method and included a number and one or more letters. The letter is a qualitative representation of the density of bubbles, whereby "F" refers to few, "D" refers to dense, "M" refers to medium, "MD" refers to medium dense, and "D" refers to dense. The number refers to the size of the blister, whereby 0 is the largest size, 10 is no blister. The bigger the number, the smaller the size of blister. Blistering rating of 2F or better indicates acceptable salt spray corrosion resistance.

GPC Analysis

The molecular weight of a polymer sample was measured by GPC analysis using an Agilent 1200. The sample was dissolved in tetrahydrofuran (THF)/formic acid (FA) (5%) with a concentration of 2 mg/mL and then filtered through 0.45 µm polytetrafluoroethylene (PTFE) filter prior to the GPC analysis. The GPC analysis was conducted using the following conditions:

Column: One PLgel GUARD columns (10 µm, 50×7.5 mm), One Mixed B columns (7.8×300 mm) in tandem, column temperature: 40° C.; mobile phase: THF/FA (5%); flow rate: 1.0 mL/minute; Injection volume: 100 µL; detector: Agilent Refractive Index detector, 40° C.; and calibration curve: PL Polystyrene Narrow standards with molecular weights ranging from 2329000 to 580 g/mol, using polynom 3 fitness.

Dispersing Efficiency

The pH of a dispersant was first adjusted to 8.8 by $NH_3 \cdot H_2O$ to give a neutralized dispersant. 125 gram (g) of water, 37.5 g of $TiO_2$ (Ti-Pure R-902), 45 g of an anti-rust pigment (Nubirox 106), 75 g of talc (Talc 800), and 90 g of barium sulfate (Blanc Fixe N $BaSO_4$ 1250) were added to a 0.5 L plastic straight cylinder to form a paste. Then 0.2-0.3 g of the neutralized dispersant obtained above was added to the above formed paste. After grinding the paste under 1,500 rpm agitation for about 2 minutes, the resultant slurry was measured for low shear viscosity (Brookfield 4#/60 rpm) with a Brookfield Viscometer (LVDV-II+). The neutralized dispersant was continuously added into the slurry until the viscosity of the slurry didn't drop. The dispersing efficiency was recorded as percentage of the dry weight of the dispersant to the dry weight of the total amount of pigments and extenders at the lowest point of the low shear viscosity of the slurry. The lower the percentage, the better the dispersing efficiency.

Dispersant A

A three-liter, five-necked flask equipped with a mechanical stirrer, nitrogen (N2) sweep, a thermocouple, and a condenser was charged with 405 g of water and 1.95 g of FES 993 surfactant. The solution in the flask was heated to 86° C. An initiator, 1.30 g of sodium persulfate (SPS) dissolved in 5 g of water, was added. Two minutes later, a monomer emulsion comprising 225.00 g of ST, 75.00 g of PAM-4000, 12.87 g of nDDM, and 18.30 g of FES 993 surfactant in 115 g of water was fed. Simultaneously, an initiator solution including 1.06 g of SPS and 60 g of water was co-fed over a period of 90 minutes while the reactant temperature was maintained at around 86° C., and held for 5 minutes after the end of the feeds. The reactant was cooled to 60° C. Then a chaser system including 4 g of ferrous sulfate solution (0.2%, aqueous), 1.18 g of t-BHP in 5 g of water, and 0.58 g of IAA in 5 g of water was added. After holding for 15 minutes, the identical chaser system was charged again. The batch was cooled down to 40° C., and a biocide solution (3.64 g of KATHON LX 1.4% biocide in 14 g of water) was added over 10 minutes. Finally, the resultant emulsion was cooled to ambient temperature and filtered through 325 mesh size screen to afford a polymer emulsion with total solids of 30% by weight and pH around 1.3, wherein the polymer (polymerized 75% ST/25% PEM, by weight based on the weight of the polymer) had an average particle size of 118.4 nm and a weight average molecular weight of 11,951 daltons.

Dispersant B

Dispersant B was prepared according to the same procedure as preparing Dispersant A above, except that the monomer emulsion used in preparing Dispersant B included 225.00 g of ST, 150.00 g of AMPS 2405, 12.87 g of nDDM, and 18.30 g of FES 993 surfactant in 55 g of water. The resultant polymer emulsion had total solids of 30% by weight and pH around 2.7, wherein the polymer (polymerized 75% ST/25% salt of AMPS, by weight based on the weight of the polymer) had an average particle size of 123.3 nm and a weight average molecular weight of 9,982 daltons.

Dispersant C

Dispersant C was prepared according to the same procedure as preparing Dispersant A above, except that the monomer emulsion used in preparing Dispersant C included 225.00 g of ST, 60.00 g of PAM-4000, 30.00 g of AMPS 2405, 12.87 g of nDDM, and 18.30 g of FES 993 surfactant in 115 g of water. The resultant polymer emulsion had total solids of 30% by weight and pH around 1.4, wherein the polymer (polymerized 75% ST/20% PEM/5% salt of AMPS, by weight based on the weight of the polymer) had an average particle size of 118.3 nm and a weight average molecular weight of 9,823 daltons.

Dispersant 1

Dispersant 1 was prepared according to the same procedure as preparing Dispersant A above, except that the monomer emulsion used in preparing Dispersant 1 included 225.00 g of ST, 45.00 g of PAM-4000, 60.00 g of AMPS 2405, 12.87 g of nDDM, and 18.30 g of FES 993 surfactant in 85 g of water. The resultant polymer emulsion had total solids of 30% by weight and pH around 1.5, wherein the polymer (polymerized 75% ST/15% PEM/10% salt of AMPS, by weight based on the weight of the polymer) had an average particle size of 118.9 nm and a weight average molecular weight of 9,127 daltons.

Dispersant 2

Dispersant 2 was prepared according to the same procedure as preparing Dispersant A above, except that the monomer emulsion used in preparing Dispersant 2 included 225.00 g of ST, 30.00 g of PAM-4000, 90.00 g of AMPS 2405, 12.87 g of nDDM, and 18.30 g of FES 993 surfactant in 85 g of water. The resultant polymer emulsion had total solids of 30% by weight and pH around 1.7, wherein the polymer (polymerized 75% ST/10% PEM/15% salt of AMPS, by weight based on the weight of the polymer) had an average particle size of 130.9 nm and a weight average molecular weight of 11,601 daltons.

Dispersant 3

Dispersant 3 was prepared according to the same procedure as preparing Dispersant A above, except that the monomer emulsion used in preparing Dispersant 3 included 225.00 g of ST, 30.00 g of PAM-4000, 49.72 g of SSS (90.5% active component), 12.87 g of nDDM, and 18.30 g of FES 993 surfactant in 110 g of water. The resultant polymer emulsion had total solids of 30% by weight and pH around 1.7, wherein the polymer (polymerized 75% ST/10% PEM/15% SSS, by weight based on the weight of the polymer) had an average particle size of 339.7 nm and a weight average molecular weight of 7,688 daltons.

Dispersant 4

Dispersant 4 was prepared according to the same procedure as preparing Dispersant A above, except that the monomer emulsion used in preparing Dispersant 4 included 228.60 g of ST, 6.00 g of PAM-4000, 130.80 g of AMPS 2405, 12.87 g of nDDM, and 18.30 g of FES 993 surfactant in 50 g of water. The resultant polymer emulsion had total solids of 30% by weight and pH around 2.0, wherein the polymer (polymerized 76.2% ST/2% PEM/21.8% salt of AMPS, by weight based on the weight of the polymer) had an average particle size of 126.6 nm and a weight average molecular weight of 11,423 daltons.

Dispersant D

Dispersant D was prepared according to the same procedure as preparing Dispersant A above, except that the monomer emulsion used in preparing Dispersant D included 225.00 g of ST, 3.00 g of PAM-4000, 144.00 g of AMPS 2405, 12.87 g of nDDM, and 18.30 g of FES 993 surfactant in 43 g of water. The resultant polymer emulsion had total solids of 30% by weight and pH around 2.1, wherein the polymer (polymerized 75% ST/1% PEM/24% salt of AMPS, by weight based on the weight of the polymer) had an average particle size of 123.6 nm and a weight average molecular weight of 11,490 daltons.

Dispersant E

Dispersant E was prepared according to the same procedure as preparing Dispersant A above, except that the monomer emulsion used in preparing Dispersant E included 225.00 g of ST, 1.50 g of PAM-4000, 147.00 g of AMPS 2405, 12.87 g of nDDM, and 18.30 g of FES 993 surfactant in 41.5 g of water. The resultant polymer emulsion had total solids of 30% by weight and pH around 2.3, wherein the polymer (polymerized 75% ST/0.5% PEM/24.5% salt of AMPS, by weight based on the weight of the polymer) had an average particle size of 123.7 nm and a weight average molecular weight of 9,993 daltons.

Dispersant F

Dispersant F was prepared according to the same procedure as preparing Dispersant A above, except that the monomer emulsion used in preparing Dispersant F included 180.00 g of ST, 48.00 g of PAM-4000, 144.00 g of AMPS 2405, 12.87 g of nDDM, and 18.30 g of FES 993 surfactant in 43 g of water. The resultant polymer emulsion had total solids of 30% by weight and pH around 1.5, wherein the polymer (60% ST/16% PEM/24% salt of AMPS, by weight based on the weight of the polymer) had an average particle size of 354.0 nm and a weight average molecular weight of 9,418 daltons.

Coating Compositions

Two-component (2k) coating compositions of Examples (Exs) 1-4 and Comparative (Comp) Exs A-F were prepared as follows, Preparation of Component A: Firstly, water (40.00 g), the above obtained dispersant (11 g), $NH_3 \cdot H_2O$ neutralizer (1.0 g), TEGO 902W defoamer (0.36 g), TEGO 1488 defoamer (0.60 g) and TEGO Twin 4100 surfactant (0.60 g) were mixed, followed by adding $TiO_2$ (Ti-Pure R-902, 24.42 g), an anti-rust pigment (Nubirox 106, 30.54 g), talc (Talc 800, 48.00 g), and barium sulfate (Blanc Fixe N $BaSO_4$ 1250, 60.00 g). The obtained mixture was then ground under 1,500 rpm agitation for about 30 minutes to form grinds. Then, letdown additives including TEXANOL coalescent (3.60 g), 15% aqueous $NaNO_2$ inhibitor solution (2.64 g), ACRYSOL RM-12W thickener (12.00 g), water (13.3 g), as well as AEH-20 dispersion (262.08 g) were added to the grinds and further stirred for 30 minutes to form Component A (Total: 510.14 g). The dispersant used in each coating composition is given in Table 1.

Preparation of Component B: Beckopox EH 613W/80WA hardener (24.00 g) was diluted with water (12.00 g) and stirred for 10 minutes to form Component B (Total: 36 g). Before application of a coating composition to a substrate, Component A and Component B were stored separately. Upon application, Component B was added to Component A at stoichiometry ratio (epoxy:amine) of 1.27:1.0 and stirred for about 15 minutes.

The above obtained coating compositions were evaluated according to the test methods described above and results are given in Table 1. As shown in Table 1, all paints formulations demonstrated acceptable heatage stability as indicated by delta KU being 15 or less. All comparative dispersants (Dispersants A through F) provided paints with poor salt spray corrosion resistance as indicated by rating of 2M or 2D. Moreover, Dispersants A-E also showed lower dispersing efficiency (all more than 2%). In contrast, Dispersants 1-4 provided paints with higher dispersing efficiency than Dispersants A-E. Dispersants 1-4 also provided paints of Exs 1-4, respectively, with better salt spray corrosion resistance than paints comprising Dispersants A-F.

TABLE 1

| Paint Formulation | Comp Ex A | Comp Ex B | Comp Ex C | Ex 1 | Ex 2 | Ex 3 | Ex 4 | Comp Ex D | Comp Ex E | Comp Ex F |
|---|---|---|---|---|---|---|---|---|---|---|
| Properties of Coating Compositions | | | | | | | | | | |
| Dispersant | | | | | | | | | | |
| Type | Dispersant A | Dispersant B | Dispersant C | Dispersant 1 | Dispersant 2 | Dispersant 3 | Dispersant 4 | Dispersant D | Dispersant E | Dispersant F |
| AMPS, %* | 0 | 25 | 5 | 10 | 15 | | 21.8 | 24 | 24.5 | 24 |
| SSS, %* | | | | | | 15 | | | | |
| PEM, %* | 25 | 0 | 20 | 15 | 10 | 10 | 2 | 1 | 0.5 | 16 |
| Total AMPS/SSS + PEM, %* | 25 | 25 | 25 | 25 | 25 | 25 | 23.8 | 25 | 25 | 40 |
| Ratio of AMPS + SSS/PEM | | | 0.25 | 0.67 | 1.5 | 1.5 | 10.9 | 24 | 49 | 1.5 |
| Dispersing efficiency, % | 2.28 | 10.10 | 2.13 | 1.56 | 0.84 | 1.11 | 1.38 | 6.55 | 7.21 | 0.94 |
| Properties of coating composition | | | | | | | | | | |
| Salt spray resistance | 2M | 2M | 2D | 2F | 2F | 2F | 2F | 2M | 2M | 2M |
| Initial viscosity, KU | 94.5 | 103 | 101.4 | 100.4 | 97.5 | 107.2 | 101 | 95.4 | 96 | 101 |
| Final viscosity (14 days at 50° C.), KU | 101.1 | 89.7 | 104.1 | 98.1 | 91 | 97.6 | 86.3 | 90.6 | 90.3 | 90.3 |

*by weight based on total monomer weight

What is claimed is:

1. A two-component waterborne coating composition comprising an epoxy component A and a component B,
    wherein the epoxy component A comprises a waterborne epoxy resin, a polymeric dispersant, and pigments and/or extenders;
    wherein the polymeric dispersant comprises (a) structural units of an ethylenically unsaturated sulfonic acid-containing monomer, a salt thereof, or a combination thereof, and (b) structural units of an ethylenically unsaturated phosphorous-containing monomer, wherein the combined amount of (a) and (b) is from 10% to 35% by weight based on the dry weight of the polymeric dispersant, and the weight ratio of (a)/(b) is from 0.3 to 20; and
    wherein the component B comprises a curing agent.

2. The coating composition of claim 1, wherein the polymeric dispersant further comprises (c) structural units of an ethylenically unsaturated nonionic monomer.

3. The coating composition of claim 1, wherein the combined amount of (a) and (b) is from 20% to 30% by weight based on the dry weight of the polymeric dispersant.

4. The coating composition of claim 1, wherein the weight ratio of (a)/(b) is from 0.4 to 12.

5. The coating composition of claim 1, wherein the ethylenically unsaturated phosphorous-containing monomer is selected from the group consisting of phosphoethyl (meth)acrylate, phosphopropyl (meth)acrylate, phosphobutyl (meth)acrylate, and salts thereof.

6. The coating composition of claim 1, wherein the ethylenically unsaturated sulfonic acid-containing monomer or a salt thereof is selected from the group consisting of sodium styrene sulfonate, sodium vinyl sulfonate, acrylamido-2-methylpropanesulfonic acid, and sodium 2-acrylamido-2-methylpropane sulfonate.

7. The coating composition of claim 1, wherein the polymeric dispersant comprises, based on the dry weight of the polymeric dispersant,
    from 10% to 15% by weight of structural units of the ethylenically unsaturated sulfonic acid-containing monomer,
    from 5% to 15% by weight of structural units of the ethylenically unsaturated phosphorous-containing monomer, and
    from 70% to 80% by weight of structural units of an ethylenically unsaturated nonionic monomer.

8. The coating composition of claim 1, wherein the polymeric dispersant has a weight average molecular weight of from 300 to 50,000 Daltons.

9. The coating composition of claim 1, wherein the polymeric dispersant is present, by dry weight based on the total dry weight of pigments and/or extenders, in an amount of from 0.01% to 10%.

10. The coating composition of claim 1, wherein the waterborne epoxy resin is an aqueous dispersion of acrylic polymer particles imbibed with an epoxy compound.

11. The coating composition of claim 1, wherein the weight ratio of the epoxy component A and the component B is from 90:1 to 1:1.

12. A method of preparing a two-component waterborne coating composition, comprising: admixing an epoxy component A and a component B,
    wherein the epoxy component A comprises a waterborne epoxy resin, a polymeric dispersant, and pigments and/or extenders;
    wherein the polymeric dispersant comprises (a) structural units of an ethylenically unsaturated sulfonic acid-containing monomer, a salt thereof, or a combination thereof, and (b) structural units of an ethylenically unsaturated phosphorous-containing monomer, wherein the combined amount of (a) and (b) is from 10% to 35% by weight based on the dry weight of the polymeric dispersant, and the weight ratio of (a)/(b) is from 0.3 to 20; and
    wherein the component B comprises a curing agent.

* * * * *